US012693123B2

(12) United States Patent
Lynch et al.

(10) Patent No.: US 12,693,123 B2
(45) Date of Patent: Jul. 28, 2026

(54) SYSTEMS AND METHODS FOR REFINING NAVIGATION INPUT

(71) Applicant: Apple Inc., Cupertino, CA (US)

(72) Inventors: Kevin M. Lynch, Woodside, CA (US); Matthew J. Allen, Menlo Park, CA (US); David A. Krimsley, Sunnyvale, CA (US); Christopher P. Foss, San Francisco, CA (US); Daniel De Rocha Rosario, San Francisco, CA (US); Andrew S. Kim, Walnut Creek, CA (US); Arian Behzadi, San Francisco, CA (US); Stephen B. Lynch, Portola Valley, CA (US)

(73) Assignee: Apple Inc., Cupertino, CA (US)

(*) Notice: Subject to any disclaimer, the term of this patent is extended or adjusted under 35 U.S.C. 154(b) by 230 days.

(21) Appl. No.: 18/460,449

(22) Filed: Sep. 1, 2023

(65) Prior Publication Data

US 2024/0102811 A1 Mar. 28, 2024

Related U.S. Application Data

(60) Provisional application No. 63/506,583, filed on Jun. 6, 2023, provisional application No. 63/376,997, filed on Sep. 23, 2022.

(51) Int. Cl.
*G01C 21/34* (2006.01)
*G01C 21/36* (2006.01)

(52) U.S. Cl.
CPC ..... *G01C 21/3415* (2013.01); *G01C 21/3605* (2013.01); *G01C 21/3691* (2013.01)

(58) Field of Classification Search
CPC ............ G01C 21/3415; G01C 21/3605; G01C 21/3691; G01C 21/362; G01C 21/3617
See application file for complete search history.

(56) References Cited

U.S. PATENT DOCUMENTS 6,323,846 B1 11/2001 Westerman et al.
6,570,557 B1 5/2003 Westerman et al.
(Continued)

FOREIGN PATENT DOCUMENTS

GB 2494649 A 3/2013
JP 2007057375 A 3/2007
(Continued)

OTHER PUBLICATIONS

Machine translation of JP2011209027 (Year: 2011).*
(Continued)

*Primary Examiner* — Anne Marie Antonucci
*Assistant Examiner* — Patrick Daniel Mohl
(74) *Attorney, Agent, or Firm* — Kubota & Basol LLP

(57) ABSTRACT

A first input to a mobile device indicates a first navigation destination at a first level of specificity. The mobile device initiates navigation towards a first location corresponding to the first navigation destination. While navigation towards the first location corresponding to the first navigation destination is ongoing and before reaching the first location, in accordance with a determination that one or more first criteria are satisfied, the mobile device prompts for an input for determination a second location corresponding to a second navigation destination with a second level of specificity, the second level of specificity more specific than the first level of specificity. The mobile device receives a second input in response to the prompt. In accordance with a determination that the second input satisfies one or more second criteria, the mobile device initiates navigation towards the second location corresponding to the second navigation destination.

51 Claims, 5 Drawing Sheets

(56) References Cited

U.S. PATENT DOCUMENTS

| | | | |
|---|---|---|---|
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,428,866 B1 * | 4/2013 | Hayes | G01C 21/3605 |
| | | | 701/400 |
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2009/0157297 A1 * | 6/2009 | Hagiwara | G01C 21/3614 |
| | | | 701/418 |
| 2014/0365125 A1 * | 12/2014 | Vulcano | G01C 21/3682 |
| | | | 701/538 |
| 2017/0074673 A1 | 3/2017 | Hirai | |
| 2019/0318443 A1 | 10/2019 | Goldman-Shenhar et al. | |
| 2020/0049517 A1 | 2/2020 | Sweeney et al. | |
| 2021/0270631 A1 | 9/2021 | Spielman et al. | |
| 2023/0349708 A1 * | 11/2023 | Qi | G01C 21/36 |

FOREIGN PATENT DOCUMENTS

| | | | |
|---|---|---|---|
| JP | 2011209027 A | 10/2011 | |
| WO | 2013/169849 A2 | 11/2013 | |
| WO | 2014/105276 A1 | 7/2014 | |
| WO | 2022143570 A1 | 7/2022 | |

OTHER PUBLICATIONS

"Maps and Navigation" in Tesla Model 3 Owner's Manual, Software version: 2021.24, North America [online]. Tesla, Inc., Jul. 23, 2023, pp. 128-132 [retrieved on Sep. 1, 2023]. Retrieved from Internet Archive Wayback Machine <https://web.archive.org/web/20210921064744if_/https://www.tesla.com/sites/default/files/model_3_owners_manual_north_america_en.pdf>.

"Maps—Navigate & Explore for Android," Google [online]. [retrieved on Apr. 30, 2024]. Retrieved from the Internet: <URL: https://download.cnet.com/maps-navigate-explore/3000-20420_4-75115642.html>.

"Apple Maps introduces new ways to explore major cities in 3D", Newsroom [online]. Apple Inc., Sep. 27, 2021 [retrieved on Apr. 30, 2024]. Retrieved from the Internet: <URL: https://www.apple.com/newsroom/2021/09/apple-maps-introduces-new-ways-to-explore-major-cities-in-3d/>.

* cited by examiner

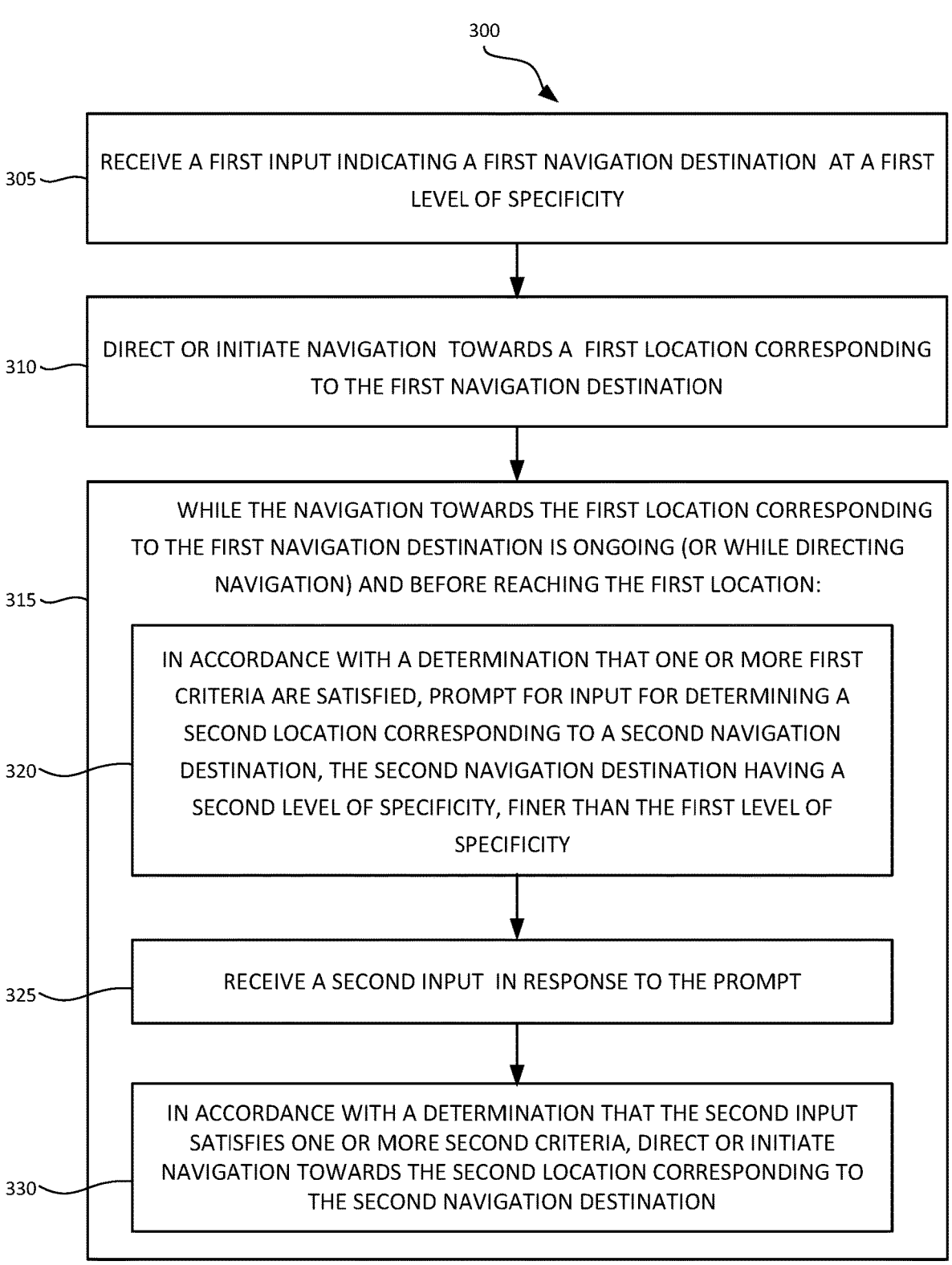

300

305 ⌐ RECEIVE A FIRST INPUT INDICATING A FIRST NAVIGATION DESTINATION  AT A FIRST LEVEL OF SPECIFICITY

310 ⌐ DIRECT OR INITIATE NAVIGATION  TOWARDS A  FIRST LOCATION CORRESPONDING TO THE FIRST NAVIGATION DESTINATION

315 ⌐ WHILE THE NAVIGATION TOWARDS THE FIRST LOCATION CORRESPONDING TO THE FIRST NAVIGATION DESTINATION IS ONGOING (OR WHILE DIRECTING NAVIGATION) AND BEFORE REACHING THE FIRST LOCATION:

320 ⌐ IN ACCORDANCE WITH A DETERMINATION THAT ONE OR MORE FIRST CRITERIA ARE SATISFIED, PROMPT FOR INPUT FOR DETERMINING A SECOND LOCATION CORRESPONDING TO A SECOND NAVIGATION DESTINATION, THE SECOND NAVIGATION DESTINATION HAVING A SECOND LEVEL OF SPECIFICITY, FINER THAN THE FIRST LEVEL OF SPECIFICITY

325 ⌐ RECEIVE A SECOND INPUT  IN RESPONSE TO THE PROMPT

330 ⌐ IN ACCORDANCE WITH A DETERMINATION THAT THE SECOND INPUT SATISFIES ONE OR MORE SECOND CRITERIA, DIRECT OR INITIATE NAVIGATION TOWARDS THE SECOND LOCATION CORRESPONDING TO THE SECOND NAVIGATION DESTINATION

FIG. 3

SYSTEMS AND METHODS FOR REFINING NAVIGATION INPUT

CROSS-REFERENCE TO RELATED APPLICATIONS

This application claims the benefit of U.S. Provisional Application No. 63/376,997, filed Sep. 23, 2022, and U.S. Provisional Application No. 63/506,583, filed Jun. 6, 2023, the contents of which are incorporated herein by reference in their entireties for all purposes.

FIELD OF THE DISCLOSURE

Aspects of the present disclosure relate to systems and methods for navigation input and refinement.

BACKGROUND OF THE DISCLOSURE

Navigation systems obtain user input that specifies a destination. Users, however, may follow a rigid paradigm for providing such input (e.g., providing an address including number, street name, and city). Alternatively, directing navigation or movement occurs without a rigid paradigm for providing inputs, but the results may be contrary to user intention.

SUMMARY OF THE DISCLOSURE

Systems and methods for refining navigation input are described below. In some embodiments, a user provides a first input to a mobile device indicating a first navigation destination at a first level of specificity. The mobile device directs or initiates navigation towards a first location corresponding to the first navigation destination. While navigating towards the first location corresponding to the first navigation destination is ongoing and before reaching the first location, in accordance with a determination that one or more first criteria are satisfied, the mobile device prompts for an input for determining a second location corresponding to a second navigation destination with a second level of specificity (e.g., the second level of specificity more specific than the first level of specificity). For example, the one or more first criteria optionally include an indication that the specificity level of the first location defines an area larger than a threshold area such that some ambiguity exists as to a final destination of the motion of the mobile device within the first location. Optionally, the one or more first criteria include a criterion that is satisfied when a confidence parameter is below a confidence threshold. The prompt for the input for determining the second location corresponding to a second navigation destination with the second level of specificity can provide an opportunity to refine the final destination of the navigation of the mobile device. As another example, the one or more first criteria optionally include an indication that the first location covers a geographical area that is accessible by multiple routes (e.g., highways) and that certain routes provide more optimal travel times to corresponding specific locations within the first location. The prompt for the input for determining the second location corresponding to a second navigation destination with the second level of specificity optionally also helps resolve ambiguities in selecting a target route amongst multiple possible routes to the first location. The mobile device receives a second input in response to the prompt. In accordance with a determination that the second input satisfies one or more second criteria, the mobile device directs or initiates navigation towards the second location in accordance with a second input indicating the second location corresponding to the second destination (e.g., with the second level of specificity, more specific than the first level of specificity).

The timing and/or the number of prompts for refinement (e.g., for input with more specificity) may vary depending on various factors including the location of the mobile device, the progress of navigation of the mobile device toward a final destination, and/or the specificity of the final destination provided by the user inputs. The systems and methods of refining navigation input described herein can provide an improved user experience by enabling a start of navigation (or continuation of navigation) of a mobile device toward a final destination without requiring the final destination to be input with complete specificity. The user optionally provides additional refinement inputs at a later time (e.g., en route), to provide additional specificity. Additional details of refining navigation input are described below.

BRIEF DESCRIPTION OF THE DRAWINGS

FIG. 3 illustrates a flowchart of an example process for navigation inputs and refinement for a mobile device in accordance with some embodiments of the disclosure.

DETAILED DESCRIPTION

Figure 1:
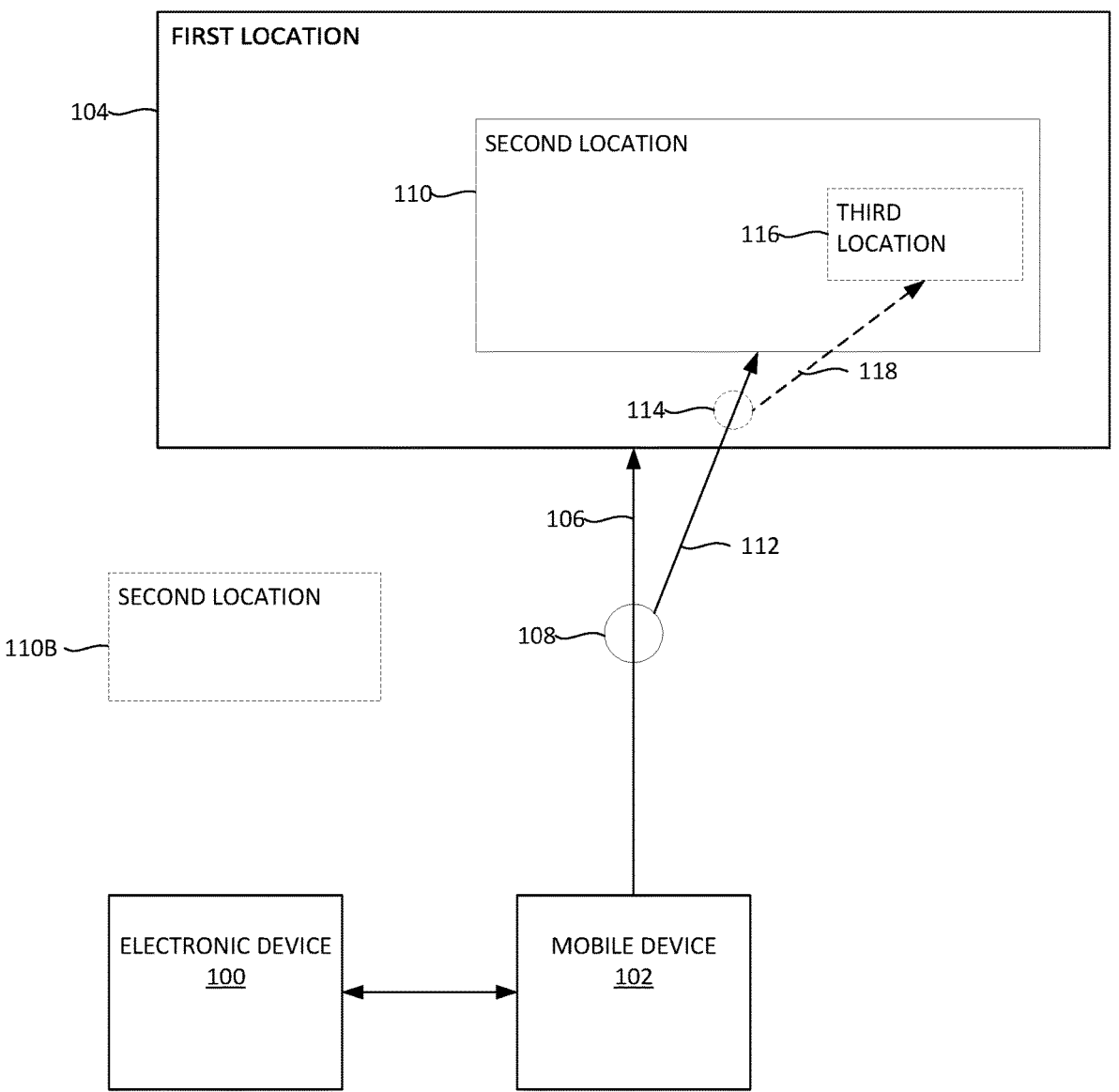
FIG. 1 illustrates an example environment including a mobile device in accordance with some embodiments of the disclosure.

Systems and methods for refining navigation input are described below. In some embodiments, a user provides a first input to a mobile device indicating a first navigation destination at a first level of specificity. The mobile device directs or initiates navigation towards a first location corresponding to the first navigation destination. While navigating towards the first location corresponding to the first navigation destination is ongoing and before reaching the first location, in accordance with a determination that one or more first criteria are satisfied, the mobile device prompts for an input for determining a second location corresponding to a second navigation destination with a second level of specificity (e.g., the second level of specificity more specific than the first level of specificity). For example, the one or more first criteria optionally include an indication that the specificity level of the first location defines an area larger than a threshold area such that some ambiguity exists as to a final destination of the motion of the mobile device within the first location. Optionally, the one or more first criteria include a criterion that is satisfied when a confidence parameter is below a confidence threshold. The prompt for the input for determining the second location corresponding to a second navigation destination with the second level of specificity can provide an opportunity to refine the final destination of the navigation of the mobile device. As another example, the one or more first criteria optionally include an indication that the first location covers a geographical area that is accessible by multiple routes (e.g., highways) and that certain routes provide more optimal travel times to corresponding specific locations within the first location. The prompt for the input for determining the second location corresponding to a second navigation destination with the second level of specificity optionally also helps resolve ambiguities in selecting a target route amongst multiple possible routes to the first location. The mobile device receives a second input in response to the prompt. In accordance with a determination that the second input satisfies one or more second criteria, the mobile device directs or initiates navigation towards the second location in accordance with a second input indicating the second location corresponding to the second destination (e.g., with the second level of specificity, more specific than the first level of specificity). As a non-limiting example, the first input may specify a city and the second input may specify a street within the city.

The timing and/or the number of prompts for refinement (e.g., for input with more specificity) may vary depending on various factors including the location of the mobile device, the progress of navigation of the mobile device toward a final destination, and/or the specificity of the final destination provided by the user inputs. The systems and methods of refining navigation input described herein can provide an improved user experience by enabling a start of a movement (or continuation of movement) of a mobile device toward a final destination without requiring the final destination to be input with complete specificity. The user optionally provides additional refinement inputs at a later time (e.g., en route), to provide additional specificity. Additional details of refining navigation input are described below.

Although refining navigation input is primarily described herein in terms of initiating navigation towards a first location corresponding to the first navigation destination, it is understood that refining a navigation input is possible without initiating navigation. For example, an application associated with navigation (e.g., a map application running on a cellular phone) can generate navigation instructions towards a first location corresponding to the first navigation destination without necessarily causing movement toward the first location. These navigation instructions can be more precise in accordance with further refinement input. In some embodiments, the prompt for refining navigation occurs after initiating navigation. In some embodiments, the initiation of navigation of the mobile device or an input indicating an intent to initiate navigation (e.g., an instruction to one or more motion actuator subsystems of the mobile device) triggers a prompt for refinement. For example, the application can determine, based on a global positioning system (GPS) information, that movement has occurred, and prompt for refinement.

FIG. 1 illustrates an example environment including a mobile device 102 in accordance with some embodiments of the disclosure. The mobile device 102 is located at an initial location within the environment, and during the process of receiving navigation input and refining navigation may navigate to various locations such as first location 104, second location 110, and/or third location 116. The movement of the mobile device toward a respective location is indicated by movement paths (also referred to as "navigation paths") such as first movement path 106, second movement path 112, and/or third movement path 118. As described herein, in some embodiments, the mobile device 102 optionally prompts the user for refinement input along the movement path (e.g., after beginning movement along a respective movement path). The prompts for refinement input are indicated by circles along the movement paths, such as at prompt point 108 along movement path 106 and/or at prompt point 114 along movement path 112. It is understood that although illustrated as points along the movement path that the one or more prompts optionally occur on a continuum and are not limited to a particular location in space or a certain time.

In some embodiments, the processing involved for receiving navigation input and refining navigation is performed by one or more processors included in mobile device 102. In some embodiments, some of the processing involved for refining navigation is performed by one or more processors of another electronic device 100 in communication with mobile device 102. In some embodiments, electronic device 100 in communication with mobile device 102 can form a computing system. Electronic device 100 can include portable and non-portable electronic devices, including but not limited to, servers, mainframe computers, personal computers, terminals, workstations, communication hubs, vehicles, mobile phones, tablet computers, laptop computers, wearable devices, and the like. As described herein, mobile device 102 can generally refer to a subset of electronic devices that are typically capable of transportation of a user.

In some embodiments, the electronic device 100 and/or mobile device 102 are configured to receive data from each other. As shown in FIG. 1, electronic device 100 and mobile device 102 are communicatively coupled for unidirectional and/or bidirectional communication. In some embodiments, the communication is enabled by one or more wireless communication protocols and circuitry such as WiFi, Bluetooth, Zigbee, cellular, satellite, etc. Although wireless communication is primarily described, it is understood that wired communication is used in some embodiments (e.g., universal serial bus (USB), etc.).

Figure 2A:
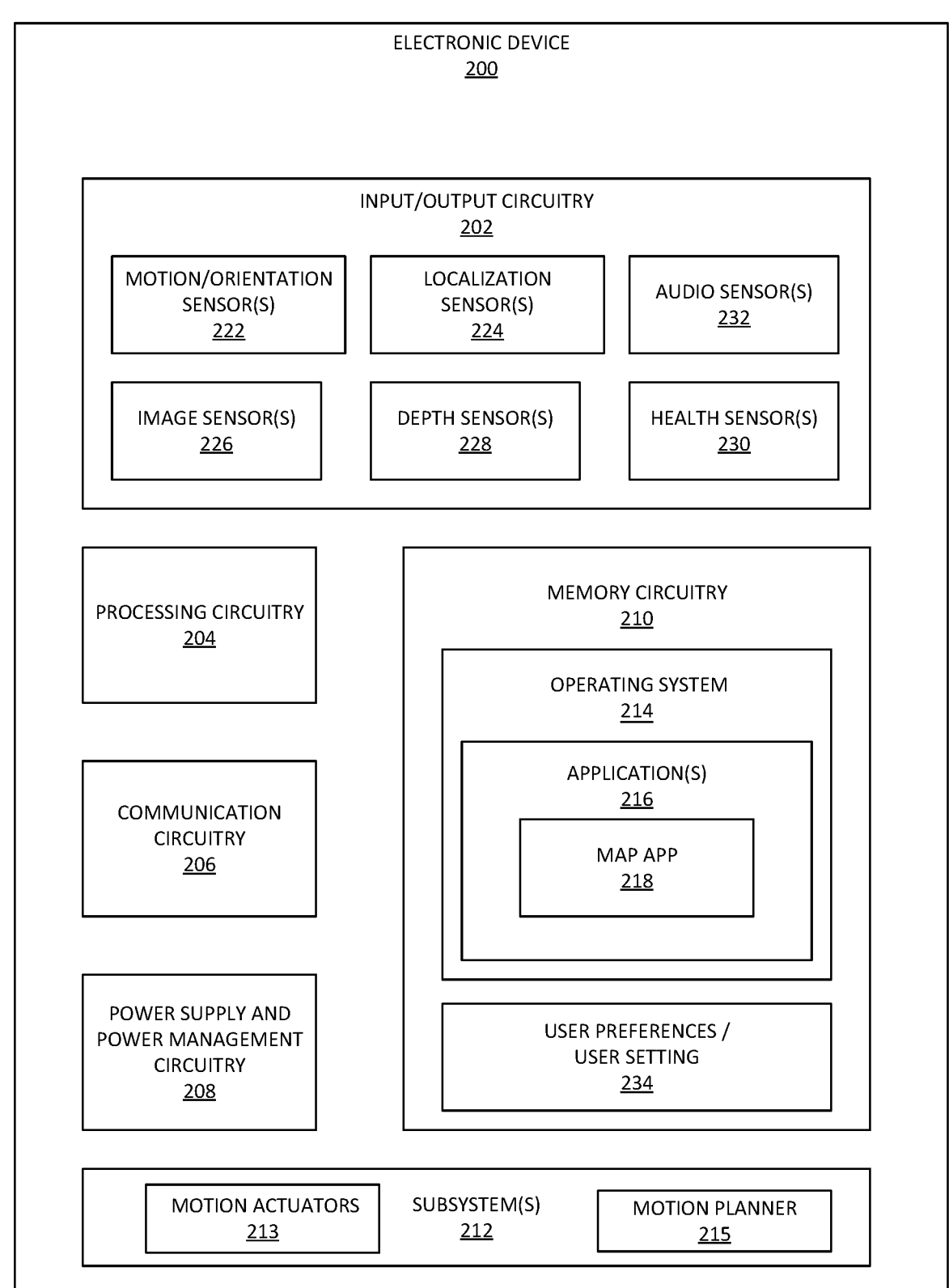
FIGS. 2A-2B illustrate block diagrams of example electronic devices in accordance with some embodiments of the disclosure.
Figure 2B:
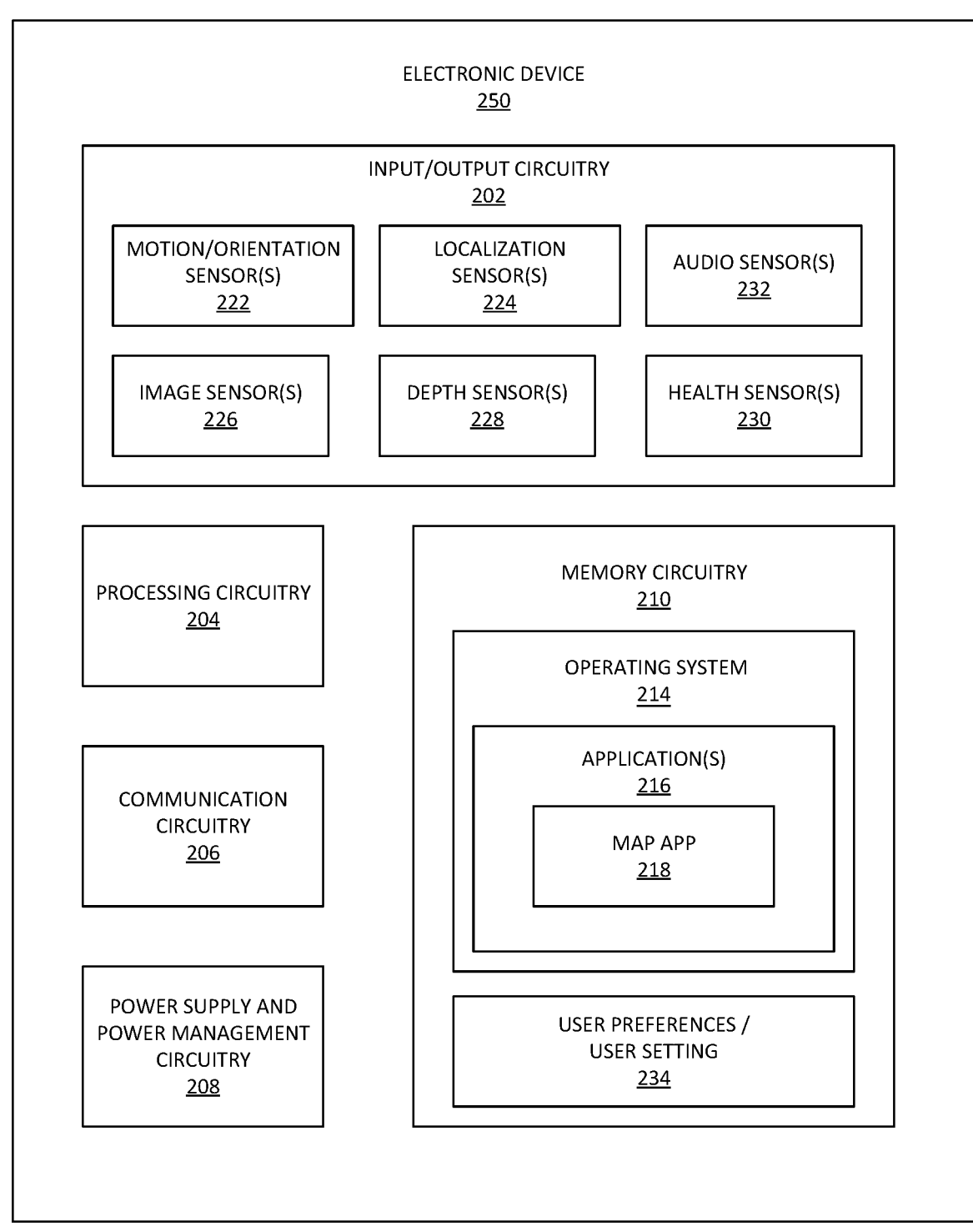

FIGS. 2A-2B illustrate block diagrams of electronic devices 200 and 250 in accordance with some embodiments of the disclosure. Electronic device 200 represents mobile device 102 in FIG. 1. Electronic device 250 represents electronic device 100 in FIG. 1. In some embodiments, electronic device 200 or electronic device 250 individually performs the techniques described herein. In some embodiments, electronic devices 200 and 250 in communication (e.g., wired or wirelessly) form a computing system corresponding to electronic device 100 and mobile device 102. It is understood that the block diagrams of FIGS. 2A-2B represent example architectures, but that some electronic devices have more or fewer components than shown in FIGS. 2A-2B and/or a different configuration of components than shown in FIGS. 2A-2B. Some of the components in FIGS. 2A-2B are optionally implemented in hardware, software, firmware, or any combination thereof.

As illustrated, electronic devices 200 and 250 include input/output circuitry 202, processing circuitry 204, communication circuitry 206, power supply and power management circuitry 208, memory circuitry 210 and one or more subsystems 212. Although not shown in FIGS. 2A-2B, the various components of electronic device 200 or electronic device 250 are optionally electrically coupled by one or more buses and/or using one or more interfaces and electrical connections.

Input/output circuitry 202 includes devices for providing input to the electronic devices 200, 250 and/or for providing output from the electronic devices. In some embodiments, input/output circuitry 202 optionally includes sensors such as one or more motion and/or orientation sensors 222, one or more localization sensors 224, one or more image sensors 226, one or more depth sensors 228, one or more health sensors 230, one or more audio sensors 232, one or more touch screens (not shown), among other possible sensors. The one or more motion and/or orientation sensors 222 optionally include one or more accelerometers, gyroscopes, and/or inertial measurement units (IMUs) to measure motion and/or orientation of electronic device 200 or electronic device 250. The one or more localization sensors 224 be used to determine location, heading, and/or orientation of electronic device 200 or electronic device 250. The one or more localization sensors 224 or localization systems optionally include a global navigation satellite system (GNSS) or sensor, an inertial navigation system (INS) or sensor, a global positioning system (GPS) or sensor, an altitude and heading reference system (AHRS) or sensor, a compass, etc. The one or more image sensors 226 and the one or more depth sensors 228 optionally include sensors to generate two-dimensional or three-dimensional images, radio detection and ranging sensors or systems, light detection and ranging sensors or systems, visual or video detection and ranging sensors or systems, infrared sensors, optical sensors, camera sensors (e.g., color or grayscale), etc. The one or more health sensors 230 optionally include heart rate sensors, blood pressure sensors, blood oxygenation sensors, glucose sensors, respiratory sensors, and temperature sensors, among other possibilities. The one or more audio sensors 232 optionally include one or more microphones, optionally arranged in an array.

Although not shown in FIGS. 2A-2B, in some embodiments, input/output circuitry 202 includes output devices, such as one or more speakers, one or more displays (part of or independent from touchscreens), and/or one or more haptic output devices that can provide audio, visual, and/or tactile feedback to a user. It is understood that, in some embodiments, additional input/output devices are included in the electronic devices described herein, such as a keyboard, a mouse, a button, a knob, a slider, a touch sensor or touch sensor panel, a touchpad, a trackpad, a touch screen, a joystick, a proximity sensor, etc.

Processing circuitry 204 optionally include one or more processors including microcontrollers, microprocessors, application specific integrated circuits (ASICs), programmable logic device (PLD), field-programmable gate arrays (FPGAs), central processing units (CPUs), graphics processing units (GPUs), digital signal processors (DSPs), or any suitable processing circuitry. Processing circuitry 204 are optionally used to perform any of the processes, methods, or functions described herein (e.g., optionally by executing instructions or programs stored in a non-transitory computer-readable storage medium). Some example functions include telephonic or video conferencing, electronic messaging or mailing, web browsing, image or video capturing, entertainment, etc. Additionally, as the functions optionally include mobile device functions such as environmental perception (e.g., identifying and/or classifying objects in the environment of the mobile device) and/or route planning for autonomously moving the mobile device (e.g., including navigation inputs and refining navigation).

Communication circuitry 206 includes circuitry to provide for wired or wireless communication with other electronic devices. For example, a computing system including electronic device 200 and electronic device 250 can communicate using wired or wireless communication. The communication circuitry optionally enables communication using different communication protocols such as WiFi, Bluetooth, Zigbee, cellular, satellite, etc. The communication circuitry optionally includes one or more transmitter and/or receiver antennas to transmit and/or receive data from one or more data sources for use in predictive actions as described herein.

Power supply and power management circuitry 208 includes one or more energy storage devices (e.g., a battery or multiple batteries) to provide a power supply for the powered components of electronic device 200 or electronic device 250. Power supply and power management circuitry 208 optionally includes circuitry for wired or wireless charging of the one or more energy storage devices. Power supply and power management circuitry 208 optionally includes circuitry to manage power delivery and usage by the components of electronic device 200 or electronic device 250, to manage charging of the one or more energy storage devices, and/or to monitor the energy levels of the one or more energy storage devices.

Memory circuitry 210 includes any suitable type of memory including, but not limited to, volatile or non-volatile memory (e.g., where data is maintained after all power is removed from electronic device 200 or electronic device 250). Memory circuitry 210 optionally includes any suitable electronic, magnetic, optical, electromagnetic, infrared, or semiconductor system, apparatus, or device. The memory circuitry optionally includes, but is not limited to, flash memory devices, random access memory (RAM) devices (e.g., dynamic random-access memory (DRAM), static random-access memory (SRAM), double-data-rate random-access memory (DDR RAM), or other high-speed RAM or solid-state RAM, etc.), read-only memory (ROM) devices, or erasable or electrically erasable programmable read-only memory devices (EPROM or EEPROM). Some of memory circuitry 210 is optionally integrated within other components of electronic device 200 or electronic device 250. Memory circuitry 210 is optionally separate from the one or more other components of electronic device 200 or electronic device 250 and electrically coupled for read and/or write operations.

The memory circuitry 210 or a subset of the memory circuitry 210 can be referred to as a computer-readable storage medium. Memory circuitry 210 and/or the non-transitory computer readable storage medium of memory circuitry 210 can store programs, instructions, data modules, data structures or a subset or combination thereof. In some embodiments, memory circuitry 210 and/or the non-transitory computer readable storage medium store an operating system 214. The operating system 214 manages one or more running applications 216 (e.g., by scheduling processing circuitry of electronic device 200 or electronic device 250 to execute the applications 216 using one or multiple processing cores). As described herein, data from some applications, such as a map application 218, are optionally obtained and/or used for processing navigation inputs and navigation refinement as described herein. In some embodiments, user preferences and/or user settings 234 are stored, with user permission, in memory circuitry 210 for use with refining navigation input described herein (e.g., a user's preference for level of specificity required to begin/maintain movement, timing of refinement prompts, etc.). In some embodiments, map application and/or user preferences and/or user settings 234 store information about historical destinations of the mobile device when authorized by the user, or destinations otherwise associated with users (e.g., associated with tickets for a future event, associated with locations of friends or family members, associated with browser search history, etc.) when authorized by the user. Additionally, memory circuitry 210 and/or non-transitory computer readable storage medium can have programs/instructions stored therein, which when executed by processing circuitry, cause the electronic device 200 or electronic device 250 (or the computing system more generally) to perform one or more functions and methods of one or more embodiments of this disclosure (e.g., navigation inputs and refinement). As used herein, a "non-transitory computer-readable storage medium" includes any medium (excluding signals) that can contain or store programs/instructions for use by the electronic device (e.g., by processing circuitry).

Electronic device 200 includes one or more subsystems 212 some or all of which are not included in electronic device 250. For example, subsystems 212 include one or more motion actuators 213. The motion actuators 213 optionally include motor controllers and systems, steering systems, brake systems to control movement of the wheels of electronic device 200. Subsystems 212 optionally include a motion planner 215, which optionally uses a navigation system and/or autonomous or semi-autonomous processors and controllers. Subsystems 212 optionally include light systems environment controls, and entertainment systems. The additional subsystems optionally include subsystems for processing of navigation inputs and refining navigation (e.g., for route planning using navigation inputs and refinement by a mobile device), as described in more detail herein. Electronic device 250 optionally includes a subsystem for processing of navigation inputs and refining navigation.

FIG. 3 illustrates a flowchart of an example process 300 for receiving navigation inputs and refining navigation for a mobile device in accordance with some embodiments of the disclosure. Refining navigation for a mobile device can improve a user experience by enabling a start of a navigation (or continuation of navigation) of a mobile device toward a final destination without requiring the final destination to be input with complete specificity. The user can provide additional refinement inputs at a later time to provide additional specificity. In some embodiments, process 300 is performed by mobile device 102 (or by a computing system including electronic device 100 and mobile device 102). In some embodiments, a portion of process 300 (e.g., directing the navigation without performing the movement of mobile device 102) is performed by electronic device 100). In some embodiments, a non-transitory computer-readable storage medium (or more than one non-transitory computer-readable storage medium) stores instructions that, when executed by one or more processors of mobile device 102 or electronic device 100 (or by a computing system including electronic device 100 and mobile device 102), causes the mobile device (or computing system) to perform one or more operations of process 300. In some embodiments, one or more operations of process 300 can be modified without departing from the scope of this disclosure.

At block 305, a first input is received. The first input indicates a first navigation destination at a first level of specificity. In some embodiments, the first input is a user input provided using input/output circuitry 202 (e.g., using the touch screen, using audio sensors, etc.). In some embodiments, the first navigation destination is obtained without a user input, such as a default first navigation destination, associated with a user (e.g., user history from user preferences and/or user settings 234 or user calendar/schedule/itinerary from a calendar application and/or passbook/ticketing application). In some embodiments, a default navigation destination is based in part on initial location information (e.g., from localization sensor 224, such as geolocation from a global navigation satellite system). For example, a different default first navigation destination is optionally used when the mobile device is at a first initial location (e.g., "home") than when the mobile device is at a second initial location (e.g., "work").

At block 310, the mobile device initiates navigation (e.g., begins moving) towards a first location corresponding to the first navigation destination (e.g., in response to the first input). Referring back to FIG. 1, the navigation of mobile device toward the first location is represented by movement of mobile device 102 toward first location 104 along movement path 106. Movement path 106 can represent route planning to the first location. The first navigation destination may vary in specificity from precise to imprecise. In some embodiments, the first navigation destination is defined by precise geographic location on the earth (e.g., GPS coordinates in degrees, minutes, and/or seconds). In some embodiments, the first navigation destination is an address (e.g., street name and number). In some embodiments, the first navigation destination is a street (e.g., a street name, such as Market Street, or specific block or group of blocks with the street name, such as North or South Rodeo Drive or 500 block of Castro Street). In some embodiments, the first navigation destination is a name associated with a location such as a user defined location (e.g., home, work, school, etc.), a business name, or a business category (e.g., gas station, restaurant, retail, etc.). In some embodiments, the first navigation destination is a neighborhood or district (e.g., Tenderloin, downtown, arts district, etc.), a city (e.g., San Francisco), a region (e.g., wine country, "Bay area"), a county (e.g., King County), a state (e.g., Oregon), a country (e.g., Canada), or any suitable area. In some embodiments, the first navigation destination is a combination of the above-described location types (e.g., a restaurant on a street in a city).

The above example locations vary in specificity. For example, a precise geographic location on Earth, a user defined location, or a complete and unique address can indicate a precise location. An address can be considered sufficiently precise when it refers to an area that is less than a threshold area, such that the specificity does not introduce ambiguity regarding a final destination where the user intends to disembark. For example, a complete and unique address that specifies a residential lot is (sufficiently) precise as indicating the user's intended destination. In such examples, refinement may not be necessary.

In contrast, a partial address, non-unique address, a city, country, or region, can indicate an imprecise location (e.g., greater than a threshold area), such that the coarse specificity introduces ambiguity regarding the final destination within the larger area defined by the first navigation destination. As an example, a partial address specifying a street name without a number (e.g., First Street) may introduce ambiguity regarding the intended destination along the street. As another example, a non-unique address specifying a street name and number without a street direction (e.g., 100 First Street) may introduce ambiguity regarding the intended destination between different directional segments of the street (e.g., between 100 North First Street or 100 South First Street). As another example, selecting San Francisco as the first navigation destination while the mobile device is in San Jose may introduce ambiguity regarding the final destination within the San Francisco city limits and which route to select for route planning (e.g., Golden Gate Bridge, Bay Bridge, 101 Freeway). As another example, a business name or type (even when a street or city is specified) may or may not introduce ambiguity regarding the intended location (e.g., there may be multiple of the same business or type in the same general direction or in opposite directions), such that an input including the business name or type may provide precise or imprecise location information (e.g., ambiguity regarding which specific business).

In some embodiments, the mobile device has confidence in the destination to which to provide directions or move the mobile device from a precise first navigation destination given in the input, whereas the mobile device lacks confidence in the destination to which to provide directions or to move the mobile device (and by which route) within the region defined by the navigation destination from an imprecise first navigation destination given in the input. Thus, refining the navigation with further input is desired when the mobile device does not have sufficient confidence in precisely where to provide directions or to move the mobile device.

In some embodiments, a confidence parameter is used to represent the level of confidence of the mobile device (e.g., confidence in the precise location corresponding to the user's intended final destination). For example, confidence is optionally represented as a value between 0 and 1, with 0 representing a minimum confidence level and 1 representing a maximum confidence level (e.g., with the maximum confidence corresponding to a precise location such as unique GPS coordinates or a unique address). In some embodiments, the confidence parameter is compared with a threshold confidence value. A confidence parameter less than the threshold confidence (e.g., corresponding to a relatively lower level of confidence in the destination matching the user's intended destination) optionally triggers a prompt for refinement as described herein. A confidence parameter greater than the threshold confidence (e.g., corresponding to a relatively higher level of confidence in the destination matching the user's intended destination) optionally does not trigger a prompt for refinement. Implementers may set such a threshold confidence at a value that results in an acceptable user experience (e.g., to enable navigation to the user intended destination with a frequency and/or a timing of prompts that comports with user expectations of mobile device 102).

It is understood that representing a confidence as a value between 0 and 1, the minimum/maximum conventions associated with these confidence values above, and the threshold confidence value constitute merely one example. Other confidence ranges, conventions, and/or threshold confidence values may be used. Additionally or alternatively, the confidence is optionally represented using a confidence state (e.g., low confidence, moderate confidence, high confidence), where the confidence states may optionally be differentiated in a similar manner described herein for confidence thresholds.

It is also understood that multiple confidence thresholds (or confidence states) are optionally used. For example, prompting is not triggered when the confidence is above both a first confidence threshold and a second confidence threshold (e.g., "high confidence" state), prompting is triggered with a first frequency or timing when the confidence is above a first confidence threshold and below a second confidence threshold (e.g., "moderate confidence" state), and prompting is triggered with a second frequency or timing (e.g., more frequent and/or earlier than above), when the confidence is below the first confidence threshold and second confidence threshold (e.g., "low confidence" state).

As an example, consider an input indicating the name of a chain retailer as a first navigation destination. If there is one location of the chain retailer that is more adjacent to the mobile device, such as one store that is within 5 miles of the mobile device, and another store that is 15 miles from the mobile device), the confidence may be above the first confidence threshold and the second confidence threshold (e.g., "high confidence" state), enabling directing navigation or initiating movement to the one location without prompting the user for refinement input. If there are two locations of the chain retailer within 5 miles and north of the position of the mobile device (e.g., one slightly to the north-east and one slightly to the north-west), the confidence may be between the first confidence threshold and the second confidence threshold (e.g., "moderate confidence" state), enabling directing navigation or initiating movement to the north and subsequently prompting the user for refinement input. However, if one of the two locations of the chain retailer within 5 miles is east of the mobile device and the second of the two locations is west of the mobile device, the confidence may be below the first confidence threshold and the second confidence threshold (e.g., "low confidence" state), which may require an immediate prompt for refinement input to enable directing navigation or initiating movement toward one of the two locations. Alternatively, the relatively low confidence may enable directing navigation or initiating movement toward one of the two locations (e.g., the closest one), but may require a prompt to improve the confidence early in the trip.

Figure 4:
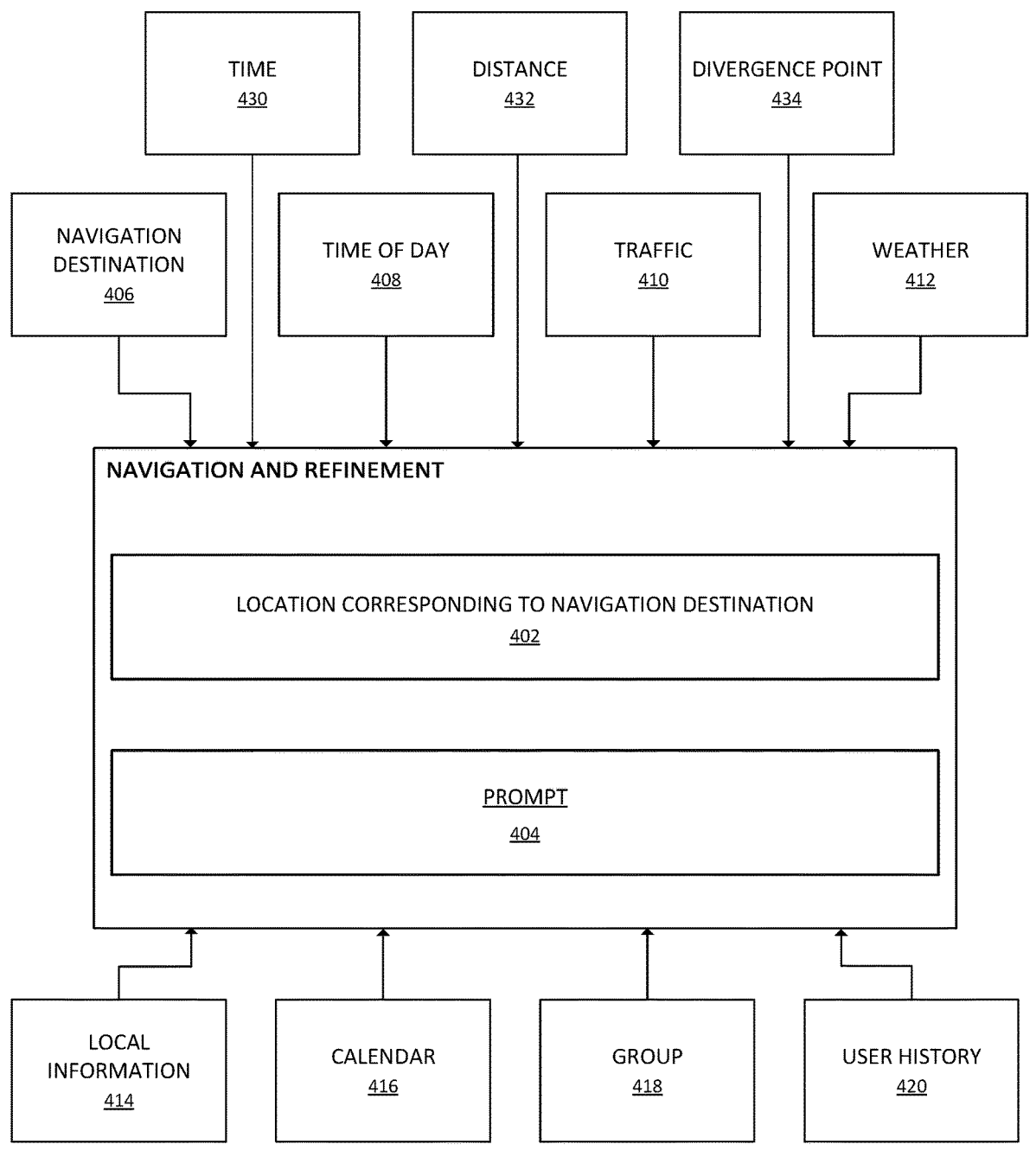
FIG. 4 illustrates a block diagram of various factors relevant to navigation inputs and refinement in accordance with some embodiments of the disclosure.

In some embodiments, the first location corresponding to the navigation destination is determined from the input and/or from one or more additional factors. FIG. 4 illustrates a block diagram of various inputs and/or factors relevant to navigation inputs and refinement in accordance with some embodiments of the disclosure. As illustrated in FIG. 4, various inputs and/or factors are optionally used to determine a first location corresponding to a navigation destination (e.g., represented by block 402). In some embodiments, the first location corresponding to the navigation destination is determined as the location within the region defined by the first navigation destination corresponding to a maximum confidence parameter when the first input is received. The confidence parameter is optionally based on one or more of the inputs and/or factors illustrated and described with respect to FIG. 4. Subsequent changes in the one or more inputs and/or factors optionally change the confidence parameter corresponding to the first location.

In some embodiments, even when the mobile device lacks confidence in where (and by which route) to direct the mobile device from the first navigation input due to the level of specificity (e.g., when the confidence parameter indicates relatively low confidence in the user's intended destination based on the first navigation input), the mobile device can initiate directions or in some cases begins moving toward the first location corresponding to the navigation destination 406 using a movement path towards a point within or at a boundary of the first navigation destination. For example, the movement path is optionally directed toward a first location defining a precise location (e.g., less than a threshold area) corresponding to the first navigation input. In some embodiments, the precise location is a point of the region defined by the first navigation destination closest to the initial position of the mobile device (e.g., minimizing the distance between the current location of the mobile device and the first navigation destination). In some embodiments, the precise location is a point at the centroid of the region defined by the first navigation destination. It is understood that determining a precise location is not limited to the closest point or the centroid.

In some embodiments, one or more additional factors are considered in determining the first location within the first navigation destination. The one or more additional factors optionally include user history 420 (e.g., including user preferences). Locations corresponding to the user history (e.g., frequently visited or searched locations) can have an increased confidence parameter relative to other locations that do not correspond to the user history (or similarly locations consistent with user preferences can have an increased confidence parameter relative to other locations that are not consistent with user preferences). For example, user history of mobile device 102 and/or map application 218 can provide an indication of sub-regions within the first navigation destination frequented (or not frequented) by the user when authorized by the one or more users and/or one or more owners of the one or more electronic devices. For example, the first location is optionally determined as a location within the region defined by the first navigation destination with the highest frequency of visits by the user based on the user history. As another example, the first location is optionally determined as a location within the region defined by the first navigation destination with the highest frequency of use in the map application (e.g., based on searches for the respective location in the map application or requests for directions to the respective location). In some embodiments, the user history 420 is obtained from a sub-routine (e.g., instructions or a program) that determines frequently used and/or most-recently used locations when such a sub-routine is authorized by the user. Optionally, such a sub-routine or another sub-routine provides a semantic link between a seemingly ambiguous navigation input and precise location. For example, a navigation input to navigate home or to work may seemingly be ambiguous (e.g., compared with a specific address corresponding to home or to work), but such a navigation input is associated with a specific address with relatively high confidence using such sub-routines (e.g., correlating home with the most-frequently visited residential address and work with the most-frequently visited business address).

In some embodiments, the first location is at the closest edge of, or the centroid of, the region defined by the first navigation destination, but modified to include portions frequented by the user and/or exclude the portions not frequented by the user). For example, the closest edge of the region defined by the first navigation destination that corresponds to a location not frequented by the user (e.g., never frequented or below a threshold such as bottom quartile or decile) can be rejected in favor of the closest edge of the region defined by the first navigation destination that corresponds to a location more frequented by the user. As another example, before determining a centroid of the region defined by the first navigation destination, the sub-regions not frequented by the user (e.g., never frequented or below a threshold such as bottom quartile or decile) can be excluded, and the centroid can be determined for the remaining sub-regions of the region defined by the first navigation destination. In other words, in some embodiments, the mobile device beginning to move toward the first location in accordance with the first input includes causing the mobile device to begin moving toward a sub-location/sub-region within the first location in accordance with user history or preferences associated with the first location. In some embodiments, the first location is determined as or biased toward the most-frequented sub-location/sub-region within the first navigation destination.

In some embodiments, the one or more additional factors include traffic conditions 410. For example, sub-regions within the first navigation destination experiencing relatively more traffic (compared with other sub-regions within the first navigation destination) can be excluded from the first location (or from consideration when determining a first location corresponding to the first navigation destination). In some embodiments, exclusion of sub-regions due to traffic applies to one or more outlier sub-regions (e.g., above a threshold on a distribution curve, such as the top quartile or top decile) or applies to one or more sub-regions experiencing excess traffic (e.g., above a threshold amount of traffic).

In some embodiments, the one or more additional factors include weather conditions 412 or time of day 408. Weather conditions or time of day, for example, can lead to exclusion of sub-regions within the first navigation destination which are determined to be incongruous with user expectations for the first navigation destination (e.g., excluding Golden Gate Park on a rainy day, an office park at night, etc.).

In some embodiments, the one or more additional factors include contextual information regarding the first location 414 (e.g., activity of others at the first location, events in the vicinity of the first location). Contextual information regarding the first navigation destination, for example, can include crowds, events, or other information that can lead to exclusion of sub-regions within the first navigation destination which are determined to be incongruous with user expectations for the first navigation destination (e.g., excluding crowded areas or areas with special events, etc.).

As another example, contextual information regarding the first navigation destination can bias the first location toward nearby events. For example, a first navigation destination of a neighborhood containing or near a stadium may cause the first location to be determined as (or bias the first location to) the stadium for an anticipated event (e.g., "Mission Bay" neighborhood in San Francisco may cause the first location to be determined as Chase Center for a basketball game or concert). In some embodiments, the one or more additional factors include calendar information 416 or event tickets. Additionally or alternatively, calendar information 416 or event tickets indicating planned attendance at an event may cause the first location to be determined as (or bias the first location to) the venue for an anticipated event.

In some embodiments, the one or more additional factors include the person or group 418 of persons moving toward the first location via the mobile device (and/or their respective calendar information, user histories, etc.). One or more persons moving toward the first location via the mobile device can provide multiple user histories providing an indication of sub-regions within the first location frequented (or not frequented) by the group of persons when authorized by the one or more users and/or one or more owners of the one or more electronic devices, which are the same or different depending on the number and composition of the group of persons. Additionally, the schedules associated with the one or more persons can bias the destination within the first navigation destination to be close enough to enable the one or more persons to keep to one or more schedules.

It is understood that all or a subset of the above inputs and/or factors can be used to determine a first location corresponding to the first navigation destination.

In some embodiments, the mobile device can display on a display of the mobile device (or of an electronic device that is in communication with the mobile device) the first location (or a sub-location/sub-region within the first navigation destination) toward which the mobile device begins moving and/or route planning to the first location (or a sub-location/sub-region within the first navigation destination).

In some embodiments, the mobile device can display on a display of the mobile device (or of a device that is in communication with the mobile device) an indication that the specificity level of the first navigation destination requires refinement (e.g., or an indication of a confidence parameter or state). For example, in some embodiments, in response to receiving the first input, in accordance with a determination that the first level of specificity is greater than a specificity threshold (or optionally that a confidence parameter is less than a confidence threshold), the mobile device provides an indication that the first level of specificity of the first navigation destination is greater than the specificity threshold (e.g., coarser specificity, corresponding to lower confidence). The one or more first criteria optionally include a criterion that is satisfied when the first level of specificity is greater than the specificity threshold (or confidence is less than a confidence threshold. Additionally or alternatively, in some embodiments, the indication is presented to the user using audio and/or haptic output. In some embodiments, the prompt for refinement described below serves as the indication. In some embodiments, the indication is presented independently from the prompt for refinement.

After initiating navigation towards the first location corresponding to the first navigation destination (at block 315), at block 320, the mobile device prompts for an input for determining a second location corresponding to a second navigation destination with a second level of specificity (e.g., the second level of specificity more specific than the first level of specificity) in accordance with a determination that one or more first criteria are satisfied. In some embodiments, the one or more first criteria provide an indication that additional refinement is required or useful to reach a final destination intended by the user. In some embodiments, the one or more first criteria include a criterion that is satisfied when the confidence parameter is less than a threshold. Additionally or alternatively, in some embodiments, the one or more first criteria provide an indication of the appropriate conditions for prompting the user for more information (e.g., a location or location in space and/or a certain time or times), as described in more detail herein. Referring back to FIG. 1, when a prompt occurs, the prompt is represented by prompt point 108 at a location in space and/or a certain time along movement path 106 for the mobile device. In some embodiments, in accordance with a determination that one or more first criteria are not satisfied (e.g., refinement not required and/or conditions are not ripe to prompt the user), the mobile device forgoes prompting for input for determining the second location corresponding to the second navigation destination with the second level of specificity. In some embodiments, the mobile device continues navigating toward the first location in accordance with the first input (e.g., continues following movement path 106).

In some embodiments, once the mobile device arrives at the first location without receiving input in response to the prompt for input, the mobile device ceases movement at the first location. In some embodiments, once the mobile device arrives at the first location without receiving input in response to the prompt for input, the mobile device continues movement. For example, the mobile device loops about the first location corresponding to the first navigation destination (e.g., circling the block or the perimeter of the region corresponding to the first navigation destination). As another example, the mobile device continues navigation past the first location (e.g., without turns until reaching a boundary of the region corresponding to first navigation destination), proceeds to a centroid of the region corresponding to first navigation destination (e.g., geographic center of San Francisco), or proceeds to a default location within the region corresponding to first navigation destination (e.g., Golden Gate bridge in San Francisco).

In some embodiments, the prompt is provided to the user using the input/output circuitry 202. In some embodiments, the prompt for the second navigation destination comprises a visual prompt on a display (e.g., a display or touchscreen of input/output circuitry 202). In some embodiments, the display is a display of the mobile device (e.g., a display of the infotainment system, a heads-up projection display, etc. corresponding to mobile device 102 and electronic device 200). In some embodiments, the display is part of an electronic device that is in communication with the mobile device (e.g., a smart phone corresponding to electronic device 100, 250). The prompt optionally includes a selectable list of navigation destinations within the first navigation destination that are presented on a display of the mobile device or device in communication with the mobile device, or optionally includes a textual question asking for more specificity regarding the first navigation destination. Additionally or alternatively, in some embodiments, the prompt for the second navigation destination comprises an audio prompt using one or more speakers (e.g., a speaker of input/output circuitry 202 corresponding to mobile device 102 and electronic device 200). In some embodiments, the one or more speakers are one or more speakers of the mobile device. In some embodiments, the one or more speakers are part of an electronic device that is in communication with the mobile device (e.g., a smart phone corresponding to electronic device 100, 250). Additionally or alternatively, in some embodiments, the prompt for the second navigation destination comprises a tactile prompt using a haptic output (e.g., from a haptic output device of input/output circuitry 202 corresponding to mobile device 102 and electronic device 200 or corresponding to electronic devices 100, 250).

At block 325, a second input is received (e.g., in response to the prompt). In some embodiments, the second input is received using input devices of the input/output circuitry 202 (e.g., using the touch screen, using audio sensors, etc.).

In some embodiments, the second input indicates a second navigation destination at the second level of specificity. In particular the second level of specificity can be more specific (e.g., finer) than the first level of specificity. As such, in some embodiments the first navigation destination at the first level of specificity corresponds to a first plurality of candidate navigation destinations, and the second navigation destination at the second level of specificity corresponds to a second plurality of candidate navigation destinations, wherein the second plurality of candidate navigation destinations is a subset of the first plurality of candidate navigation destinations. Because the second level of specificity is more specific than the first level of specificity, the second input refines the location for the final destination of the mobile device. In some embodiments, the second navigation destination is within a region defined by the first navigation destination (e.g., as illustrated in FIG. 1 by second location 110 being located within the area of first location 104). For example, the first input can specify a city as the first navigation destination and the second input can specify a street/address within the city (e.g., thereby excluding areas of the city not including the specified street/address). As another example, the first input can specify street as the first navigation destination and the second input can specify an address number (e.g., thereby excluding other address numbers on the street). In some embodiments, the second input and the first input together are viewed as providing refinement. For example, when the second navigation destination is more specific than the specificity of the first navigation destination and within the first navigation destination, the first and second inputs together are viewed as providing the second location, which is a subset of the first navigation destination, as the refined location for the final destination.

At block 330, the mobile device initiates navigation towards the second location corresponding to the second navigation destination in accordance with a determination that the second input satisfies one or more second criteria. The one or more second criteria provide an indication that the second input is responsive to the prompt to provide refinement (e.g., and correspondingly the second input thereby increases the confidence parameter in the second location compared with the confidence parameter in the first location prior to the second input). Referring back to FIG. 1, while the mobile device navigates towards the first location 104 along movement path 106, and after receiving the second input in response to a prompt represented at prompt point 108, the movement of mobile device is updated toward the second location. As shown in FIG. 1, the movement of mobile device toward the second location is represented by movement of mobile device 102 toward second location 110 (or a point within or on a region indicated by the second navigation destination, such as when the mobile device lacks confidence in the final destination with enough precision from the second navigation destination) along movement path 112. Movement path 112 can represent route planning to the second location from the location of the mobile device 102 along movement path 106 at prompt point 108 (e.g., from the input received in response to prompt indicated at prompt point 108). In some embodiments, the route planning for the mobile device is updated in accordance with the second input. For example, moving toward the second location results in modifying the original route planning corresponding to the first input (e.g., changing routes).

In some embodiments, the mobile device displays on a display of the mobile device (or of a device that is in communication with the mobile device) the second location (or a sub-location/sub-region within the second navigation destination) toward which the mobile device begins moving and/or route planning to the second location (or a sub-location/sub-region within the second navigation destination). In a similar manner as described above for the first location, in some embodiments, one or more additional factors are optionally considered in determining the second location corresponding to the second navigation destination as a sub-region within the second navigation destination (or in determining the location as a sub-region for any subsequent locations indicated by subsequent user inputs of navigation destinations).

As described herein (e.g., process 300 at block 320), when the one or more first criteria are satisfied, a prompt for refinement is presented to the user. When the one or more first criteria are not satisfied, the prompt for refinement is not presented to the user. Thus, while the navigation towards the first navigation destination is ongoing, in accordance with the determination that the one or more first criteria are not satisfied (e.g., optionally when the confidence parameter is above a threshold confidence), the mobile device continues to navigate to the first destination. Optionally, under such conditions, the mobile device navigates from the starting location to the first navigation destination without prompting for input for determining the respective navigation destination having the second level of specificity.

Although process 300 describes a first input and a second, refining input, it is understood that, in some embodiments, the second input is not a refining input, but an entirely new navigation destination. In some such embodiments, the one or more second criteria can provide an indication of user intention to provide an alternative navigation destination instead of a refinement destination.

Although process 300 describes a first input and prompting for a second input, it is understood that, where additional location precision is required or useful for route planning, additional prompts are possible. For example, after the mobile device begins moving towards the second location, the mobile device optionally prompts for an input for determining a third location corresponding to a third navigation destination with a third level of specificity (e.g., the third level of specificity more specific than the first and/or second level of specificity) in accordance with a determination that one or more third criteria (e.g., the same or similar to the first criteria) are satisfied, and causing the mobile device to initiate navigation towards the third location corresponding to the third navigation destination in accordance with the a third input satisfies one or more fourth criteria (e.g., the same as or similar to the one or more second criteria). Referring back to FIG. 1, when another prompt for refinement occurs, the prompt is represented by prompt point 114 at a location in space and/or certain time along movement path 112 for the mobile device. The movement of mobile device 102 toward the third location is represented by movement of mobile device 102 toward third location 116 along movement path 118 (e.g., representing route planning to the third location). It is understood that more than three prompts and adjustments to the movement of the mobile device are possible. In some embodiments, the number of prompts is limited (e.g., to one prompt, two prompts), and optionally the user is notified to provide more specific information than included in previous responses to a prompt. In some embodiments, any number of prompts is provided until the input from the user provides the mobile device with a location defining a region less than a threshold area (or corresponding to a high confidence above a confidence threshold). Generally speaking, such a threshold area would be tuned to comport with user expectations of mobile device 102. For example, a threshold area of 50 by 50 feet area could result in, as a theoretical matter, mobile device 102 stopping up to about 70 feet short of an intended final destination. In order words, the user may need to walk 70 feet to their destination after disembarking. Implementers may consider whether such a threshold is within acceptable user experience and optimize whether to prompt for additional refinement accordingly.

In some embodiments, the second input and the first input together provide for refinement. For example, when the second input and the first input each provide ambiguity regarding the precise final destination, the combination of the first and second inputs may provide refinement compared with either input alone. As an example, when the second input indicating the second navigation destination represents both a first respective location within a region defined by the first navigation destination and a second respective location outside the region defined by the first navigation destination, the mobile device disambiguates the second location destination corresponding to the second navigation destination to be the first respective location within the region defined by the first navigation destination and initiates navigation toward the second location (e.g., toward the first respective location within the region defined by the first navigation destination). Referring back to FIG. 1, mobile device 102 disambiguates between second location 110 within first location 104 and second location 110B outside the first location 104 based on the first and second inputs. As a concrete example, when the first input is a city as the first navigation destination and the second input is a street name that is located in multiple cities as a second navigation destination (e.g., First Street), the mobile device can disambiguate that the street associated with the second input within the city associated with the first input is (or includes) the final destination for the mobile device.

More generally, the refinement can be viewed as the intersection (e.g., a mathematical intersection, overlap in a Venn diagram) between a first region (or multiple first regions) defined by the first input and a second region (or multiple second regions) defined by the second input. Referring to the preceding example, a first region is defined by the city indicated in the first input and multiple second regions are defined by the multiple streets with a name indicated by the second input. The intersection between a respective one of the second regions (e.g., within the first region) and the first region is the refined location toward which the mobile device begins moving. For example, the first input may specify a city, such as New York City, that has multiple streets, and the second input may specify a street, such as Fifth Avenue, that exists in multiple cities. Taken together, the first and second inputs provide a more specific destination than they do as individual inputs.

In some embodiments, the second level of specificity itself may be viewed in some respects as coarser than the first level of specificity, but still enables refinement of the final destination for the mobile device. For example, the first input can specify a restaurant or retail chain with multiple locations each providing a relatively precise location (but, which also may be viewed collectively defining an area that includes the multiple locations) and the second input can specify relatively imprecise locations (e.g., a street or a city), which is larger in area than each of the multiple locations, but may or may not be larger in area than the area defined by the multiple locations. However, the combination of the restaurant or retail chain and the city or street can allow for refinement of the precise location (e.g., the combination of the first and second inputs may indicate a unique branch of the restaurant or retail chain, or a subset of branches).

In some embodiments, as described herein, the mobile device more generally initiates navigation toward a refined destination corresponding to the intersection of the first input and the second input (e.g., in accordance with the first input and second input (or other additional inputs) responsive to the one or more prompts) rather that moving toward an independently ambiguous second location corresponding to the second navigation destination.

As described above, in some embodiments, the one or more first criteria provide an indication of whether to prompt the user for more information regarding the final destination and/or provide for the prompt to occur under the appropriate conditions. In some embodiments, the one or more first criteria include a criterion that is satisfied when the first navigation destination defines an area larger than a threshold area (and that is not satisfied when the first navigation destination defines the area smaller than the threshold area). Additionally or alternatively, in some embodiments, the one or more first criteria include a criterion that is satisfied when the first navigation destination corresponds to more than a threshold number (e.g., 1, 10, etc.) of potential navigation destinations (and that is not satisfied when the first navigation destination corresponds to fewer than the threshold number of potential navigation destinations). Additionally or alternatively, in some embodiments, the one or more first criteria include a criterion is satisfied when the first input corresponds to a request to navigate to a geographic area (e.g., a city, state, county, neighborhood) without indicating a location within the geographic area. Additionally or alternatively, in some embodiments, the one or more first criteria include a criterion that is satisfied when the confidence parameter is below a threshold confidence (e.g., corresponding to a lower confidence state), and that is not satisfied when the confidence parameter is higher than the threshold confidence (e.g., corresponding to a higher confidence state). Thus, the prompt is presented to the user only when further refinement is required, and not presented to the user when further refinement is not required.

Referring back to FIG. 4, various inputs and/or factors are optionally used to determine timing of a prompt for additional input (e.g., represented by block 404). The timing for the prompt is optionally based on a confidence parameter falling below one or more confidence thresholds or a state transition into a lower confidence state (e.g., indicative of a lack of confidence in a user's intended destination). In addition to the factors and input mentioned with respect to determining the first location corresponding to the navigation destination (e.g., represented by block 402), the presentation of the prompt can be based on additional information.

In some embodiments, the presentation of the prompt is based on distance 432, based on time 430, based on a divergence point 434 in route planning, or based on a combination thereof. For example, the prompt is optionally presented at some distance before reaching the first location, at some time before reaching the first location, or at some distance before reaching a divergence point in route planning. Generally speaking, the timing of the prompt would be tuned to comport with user expectations of mobile device 102 (e.g., to not provide the prompt too early, to provide the user with sufficient time to input a response to the prompt, etc.). Implementers may specify and/or optimize the timing of the prompt to be within specifications for an acceptable user experience. Additionally, in some embodiments, additional factors impact the presentation of prompts. Additionally details regarding some triggers for the prompt are discussed below.

In some embodiments, the prompt for additional information is presented to a user when the mobile device is at a location in space (e.g., when the confidence parameter falls or remains below the threshold at the location in space). In some embodiments, the location in space is defined in absolute terms or relative to progress on along a movement path 106. In some embodiments, the one or more first criteria include a criterion that is satisfied when the mobile device is within a threshold distance of the first location (and that is not satisfied when the mobile device is outside the threshold distance of the first location). In some embodiments, the threshold distance is 1000 meters, 5000 meters, etc.). Implementers may specify and/or optimize a threshold distance that is within acceptable user experience to comport with user expectations of mobile device 102. Additionally or alternatively, in some embodiments, the one or more first criteria include a criterion that is satisfied when the mobile device completes a threshold portion of a navigation from a starting location for the navigation to the first location (and that is not satisfied when the mobile device does not complete the threshold portion of the navigation from the starting location to the first location). In some embodiments, the threshold portion is 75%, 50%, etc. Implementers may specify and/or optimize the threshold portion of the travel distance that is within acceptable user experience to comport with user expectations of mobile device 102.

In some embodiments, the prompt for additional information is presented to a user at a certain time (e.g., when the confidence parameter falls or remains below the threshold at the certain time). In some embodiments, the certain time is defined in absolute terms or relative to progress on along a movement path 106. Additionally or alternatively, in some embodiments, the one or more first criteria include a criterion that is satisfied when an estimated time of arrival of the mobile device at the first location is within a threshold duration of a current time (and that is not satisfied when the estimated time of arrival of the mobile device at the first location is outside the threshold duration of the current time). In some embodiments, the threshold duration is 5 minutes, 10 minutes, 30 minutes, etc. Implementers may specify and/or optimize a threshold duration that is within acceptable user experience to comport with user expectations of mobile device 102. Additionally or alternatively, in some embodiments, the one or more first criteria include a criterion that is satisfied when a threshold portion of an estimate travel time from a starting location for the navigation to the first location passes after initiating the navigation towards the first location (and that is not satisfied when less than the threshold portion of the estimated travel time from the starting location to the first location has not pass after initiating navigation toward the first location). In some embodiments, the threshold portion is 75%, 50%, etc.). Implementers may specify and/or optimize the threshold portion of the travel time that is within acceptable user experience to comport with user expectations of mobile device 102.

Additionally or alternatively, the location in space and/or certain time is optionally defined in absolute terms or relative to distance/progress to a decision point in route planning (e.g., based on a divergence point). For example, route planning optionally includes identifying a plurality of routes (e.g., which may depend on traffic information received by electronic device 100 and/or mobile device 102) towards the first location that have the same distance (or estimated travel time) to the first location (or within a threshold such as 1%, 5%, 10%, etc.). However, the plurality of routes may differ in terms of total distance (or total estimated travel time) depending on the sub-region within the region defined by the first navigation input. Thus, further refinement of the final destination prior to the divergence point can improve route selection by reducing overall travel time/distance. As a result, the location in space and/or certain time for the prompt (e.g., when the confidence parameter falls or remains below the threshold at the location in space and/or certain time) is optionally defined relative to a decision point for selecting among the plurality of routes. Thus, in some embodiments, as part of route planning, the mobile device identifies a point of divergence between a plurality of movement paths of the mobile device to the first location. In some such embodiments, the one or more first criteria include a criterion that is satisfied when a current navigation position of the mobile device reaches the point of divergence between a plurality of navigation paths (and that is not satisfied when the current navigation position of the mobile device has not yet reached the point of divergence).

In some embodiments, an additional buffer is provided prior to reaching the point of divergence to provide a user time to respond to the prompt before reaching the point of divergence. In some such examples, the one or more first criteria include a criterion that is satisfied when a current navigation position of the mobile device is within a threshold duration from reaching the point of divergence between a plurality of navigation paths to the first location (and that is not satisfied when the current navigation position of the mobile device is outside the threshold duration from the point of divergence between the plurality of navigation paths to the first location). In some embodiments, the threshold duration is 5 minutes, 10 minutes, etc. (or a threshold portion of the estimated travel time between the initial position and the point of divergence is 90%, 75%, etc.). Implementers may specify and/or optimize a threshold and/or buffer that is within acceptable user experience to comport with user expectations of mobile device 102.

Additionally or alternatively, in some embodiments, as part of route planning, the mobile device identifies a point of divergence between a plurality of movement paths of the mobile device to the first location. In some such embodiments, the one or more first criteria include a criterion that is satisfied when a current navigation position of the mobile device is within a threshold distance from an estimated time of arrival of the mobile device at the point of divergence (and that is not satisfied when the current navigation position of the mobile device is outside the threshold distance from an estimated time of arrival of the mobile device at the point of divergence). In some embodiments, the threshold distance is 1000 meters, 5000 meters, etc. (or a threshold portion of the distance between the initial position and the point of divergence is 90%, 75%, etc.). Implementers may specify and/or optimize a threshold and/or buffer that is within acceptable user experience to comport with user expectations of mobile device 102.

It is understood that the second input providing a second navigation destination received before reaching the point of divergence may cause a selection among the plurality of movement paths without the second user input providing a direct selection among a plurality of movement paths (e.g., the second input is a navigation destination input, not a selection of a specific movement path option among multiple movement path options presented to the user).

In some embodiments, timing of the presentation of the prompt based on distance, based on time and/or based on a divergence point in route planning is dynamically adjusted based on one or more additional factors. The additional factors can include traffic conditions 410, weather conditions 412, time of day 408, contextual information regarding the location 414 (e.g., activity of others at the first location), calendar information 416, user history 420, and/or the person or group 418 of persons moving toward the first location via the mobile device (e.g., the individual calendar and/or history of the user or combined user histories and/or calendars of the group of users), with appropriate user approval. The additional factors optionally impact the confidence parameter thereby advancing a prompt earlier in time or earlier along the route (e.g., when the confidence parameter is reduced) or delaying the prompt later in time or later along the route or avoiding the need for the prompt entirely (e.g., when the confidence parameter is increased).

For example, changing traffic conditions can cause a change in the point of divergence or can change an estimated travel time, which can cause the timing of the prompt to occur sooner or later. In some embodiments, changes related to the one or more factors may lead to reduced confidence (e.g., reduced confidence parameter) regarding the initial determination of a sub-region within a navigation destination (e.g., the first location at block 402), and as a result, the distance, time, and/or one or more points of divergence to a revised determination of the sub-region within the navigation destination or at a boundary of the navigation destination may result in triggering the prompt earlier or later. For example, the changes in the one or more factors may cause reduced confidence in an initial determination of a centroid of the first navigation destination as the destination, and a revised determination of an outer boundary of the first navigation destination may cause changes in the total distance, total time, and/or a point of divergence to reach the revised determination of an outer boundary of the first location.

In some embodiments, when an input is not received in response to the prompt, the prompt is repeated. The timing of the presentation of the repeated prompt is optionally based on distance, based on time, based on a divergence point in route planning, any of the additional factors described herein, or based on a combination thereof (e.g., in a similar manner as described above, and optionally based on a confidence parameter). For example, the prompt is repeated at some distance before reaching the location, at some time before reaching the location, or at some distance before reaching a divergence point in route planning. Generally speaking, the timing of the repeated prompt would be tuned to comport with user expectations of mobile device 102 (e.g., to not provide the repeated prompt too closely to the prior prompt, to provide the user with sufficient time to input a response to the prompt, etc.). Implementers may specify and/or optimize the timing of the repeated prompt to be within specifications for an acceptable user experience.

Additionally or alternatively, in some embodiments, the one or more first criteria also include a criterion (or multiple criteria) indicative that the user can safely and/or conveniently provide refinement input. For example, the prompt may occur when the mobile device is moving at less than a threshold speed (e.g., 25 mph, 10 mph, 5 mph), less than a threshold of the posted speed limit (e.g., less than 25%, 10%, etc.), or stationary (e.g., stopped at a red light or heavy traffic) before providing a prompt. Thus, in some embodiments, the one or more first criteria include a criterion that is satisfied when the mobile device (e.g., current navigation position) is moving below a threshold velocity for a threshold period of time (and that is not satisfied when the mobile device (e.g., current navigation position) is moving above the threshold velocity or below the threshold velocity for less than the threshold period of time). In some embodiments, the prompt is optionally timed to occur while audio or media playback is paused/inactive or between playback of media (e.g., between songs/podcasts, when changing stations, etc.) to avoid interference with media playback. In some embodiments, the prompt occurs when the user provides other input with respect to the map application 218 (e.g., indicative that the user is directing attention to navigation). In some embodiments, these speed or attention criteria cause a prompt to occur earlier than solely relying on time, distance and/or routing criteria.

Referring back to process 300, the mobile device prompts for input in accordance with a determination that one or more first criteria are satisfied. In some embodiments, the prompt requests the user to provide a refinement on the first navigation destination, such as in the form of a more specific second navigation destination. In some embodiments, the prompting for input includes suggesting a respective navigation destination having a third level of specificity, more specific than the first level of specificity. In such embodiments, the second input corresponds to selection of a suggested navigation destination provided by the mobile device or computing system during the prompting. For example, the prompt optionally includes a list of navigation destinations within the first navigation destination that are presented on a display of the mobile device or device in communication with the mobile device, and the second input is a selection (e.g., using a touch screen) of one of the list of navigation destinations. Additionally or alternatively, in some embodiments, the prompt optionally includes an audio message including a list of navigation destinations within the first navigation destination, and the second input is a selection (e.g., using a verbal input) of one of the list of navigation destinations.

In some embodiments, the type and/or contents of the prompt are optionally dependent on the input and/or various factors. Referring back to FIG. 4, the type and/or contents of the prompt are optionally dependent on the navigation destination 406, time of day 408, traffic conditions 410, weather conditions 412, contextual information regarding the location 414 (e.g., activity of others at the first location), calendar information 416, user history 420, the person or group 418 of persons moving toward the first location via the mobile device (e.g., the individual calendar and/or history of the user or combined user histories and/or calendars of the group of users, with appropriate user approval), the time 430, the distance 432, and/or a divergence point 434.

For example, when a respective set of one or more factors is a primary driver for presentation of a prompt for refinement, the prompt can provide an indication of the respective set of one or more factors driving the prompt. For example, when an upcoming divergence point is the primary factor for the prompt, the prompt can indicate the need for refinement based on the upcoming divergence point. As yet another example, when the prompt is primarily driven by progress along the navigation route to the first location (e.g., in distance or time), the prompt can indicate the need for refinement based on the progress.

In some embodiments, the prompt can provide an indication of the respective set of one or more factors driving the prompt and optionally present navigation destinations for refinement that correspond to the respective set of one or more factors. For example, when traffic conditions are exacerbated along the navigation route to the first location corresponding to the first navigation destination, but navigation to a different location corresponding to the first navigation destination (using the same route or a different route), the prompt can indicate the need for refinement based on traffic conditions. Additionally or alternatively, the prompt can include suggestions for one or more different locations corresponding to the first navigation input that would avoid or mitigate the adverse traffic conditions causing the prompt.

In some embodiments, the prompt can include suggestions for one or more different locations corresponding to the first navigation input based on the various factors (e.g., independent of whether and how these one or more factors contributed to the presentation of the prompt). For example, the time of day, weather conditions, or user preferences may factor in the types of suggested destinations. For example, the suggested navigation destinations may include indoor locations when weather is poor, may include locations for dinner or entertainment in the evening, or may include previously visited destinations within the navigation destination. As another example, the suggested navigation destinations may include a suggested locations for the group of persons based on shared user preference that are different than the suggested locations for a different group (e.g., different persons, different size, etc.).

As described herein, the first input indicating the first navigation destination at the first level of specificity primarily refers to a physical location. In some embodiments, rather than a physical location, the first input includes an activity. For example, the first input corresponds to a request to navigate to a place at which to perform an activity without indicating a location at which to perform the activity. In some such embodiments, the mobile device initiates navigation toward a location at which to perform the activity. In some embodiments, the location towards which the mobile device initiates navigation is based on the various factors described herein (e.g., corresponding to block 402). For example, when the activity is tennis, the first location can initiate navigation to a tennis court. The specific tennis court toward which navigation is initiated can be based, with appropriate user approval, on user history (e.g., places the user has gone previously for tennis), based on local information (e.g., how crowded the tennis courts are), calendar information (e.g., to select a tennis court within a range that enables the user to play tennis without interfering with the ability to make subsequent calendar events), weather (e.g., to select a tennis court in an area not experiencing poor weather), time of day (e.g., selecting a tennis court with lighting in the evening), traffic (e.g., selecting a tennis court that does not require much time sitting in traffic), etc. It is understood that changes in the various factors can cause a prompt for refinement similar as discussed above for a navigation destination that is a physical location and not an activity. In some embodiments, the prompt for refinement and/or the suggested destinations is influenced by the suitability for the activity and/or based on the one or more factors described herein.

Although refining navigation input is primarily described herein in terms of initiating navigation towards a first location corresponding to the first navigation destination, it is understood that refining a navigation input is possible without initiating navigation. For example, an application associated with navigation (e.g., a map application) on an electronic device (e.g., a smart phone or tablet, corresponding to electronic device 100, 250) can generate navigation instructions towards a first location corresponding to the first navigation destination, without initiating navigation. These navigation instructions are made more precise in accordance with further refinement input (e.g., to the electronic device corresponding to electronic device 100, 250 or to a mobile device corresponding to mobile device 102 and electronic device 200) and in accordance with movement of the electronic device (with or without movement of mobile device 102, such as movement of the electronic device carried by a user walking). For example, the application can determine, based on GPS information, that movement has occurred, and prompt for refinement. In some embodiments, the navigation instructions from the electronic device (e.g., a smart phone or tablet, corresponding to electronic device 100, 250) direct or otherwise initiate movement of the mobile device (e.g., mobile device 102). Additionally, it is understood that initiating navigation of a mobile device as described herein optionally corresponds to initiating navigation controlled entirely by the mobile device, controlled by an operator of the mobile device, or controlled by a combination the mobile device and the operator.

It is understood that refinement described herein contemplates refinement where a destination includes multiple sub-locations at which to exit the mobile device. For example, an input with one or more refinements can be used to direct navigation or movement toward an airport, and one or more subsequent prompts and inputs may be used to specify a terminal or whether to proceed to an arrival or departure level. As another example, an input with one or more refinements can be used to direct navigation or movement toward a restaurant, but a subsequent prompt and input can be used to specify whether to use a drive-through lane or a parking lot depending on whether the user intends to dine in or take out.

The embodiments above contemplate use of information such as travel history, calendar entries, location information to beneficially aide in navigating a user to an intended destination. Implementers are reminded to abide by well-established privacy regulations and practices in handling such information. In particular, such entities should implement and consistently use privacy policies and practices that are generally recognized as meeting or exceeding industry or governmental requirements. For example, appropriate privacy practices may include informing users of information to be used, and obtaining use permission (e.g., opt-in) before such use. Further, risk can be minimized by limiting the collection of data, controlling how the data is stored, and deleting data once it is no longer needed.

The invention claimed is:

1. A method comprising:
    at a computing system in communication with one or more input devices:
        receiving, via the one or more input devices, a first input indicating a first navigation destination at a first level of specificity;
        directing navigation towards a first location corresponding to the first navigation destination;
        while navigating towards a first location corresponding to the first navigation destination is ongoing and before reaching the first location:
            in accordance with a determination that one or more first criteria are satisfied, including a first criterion that is based on a confidence value of the first navigation destination, prompting for input for determining a second location corresponding to a second navigation destination with a first frequency or first timing, the second navigation destination having a second level of specificity, more specific than the first level of specificity; and
            in accordance with a determination that one or more second criteria are satisfied, including a second criterion that is based on the confidence value, prompting for input for determining the second location corresponding to the second navigation destination with a second frequency different from the first frequency or second timing different from the first timing;
        receiving, via the one or more input devices, a second input in response to the prompt; and
        in accordance with a determination that the second input satisfies one or more third criteria, directing navigation towards the second location corresponding to the second navigation destination.

2. The method of claim 1, wherein the first navigation destination at the first level of specificity corresponds to a first plurality of candidate navigation destinations, and the second navigation destination at the second level of specificity corresponds to a second plurality of candidate navigation destinations, wherein the second plurality of candidate navigation destinations is a subset of the first plurality of candidate navigation destinations.

3. The method of claim 1, wherein the second navigation destination is within a region defined by the first navigation destination.

4. The method of claim 1, wherein the second navigation destination is determined using data from the first input and data from the second input.

5. The method of claim 1, wherein the one or more first criteria include a criterion that is satisfied when the first navigation destination corresponds to an area larger than a threshold area, and that is not satisfied when the first navigation destination corresponds to an area smaller than the threshold area.

6. The method of claim 1, wherein the one or more first criteria include a criterion that is satisfied when the first navigation destination corresponds to more than a threshold number of potential navigation destinations, and that is not satisfied when the first navigation destination corresponds to fewer than the threshold number of potential navigation destinations.

7. The method of claim 1, further comprising:

while the navigation towards the first navigation destination is ongoing and in accordance with a determination that the one or more first criteria are not satisfied, forgoing prompting for input for determining a respective navigation destination having the second level of specificity.

8. The method of claim 1, wherein the one or more first criteria include a criterion that is satisfied when a current navigation position is within a threshold distance of the first location, and that is not satisfied when the current navigation position is outside the threshold distance of the first location.

9. The method of claim 1, wherein the one or more first criteria include a criterion that is satisfied when more than a threshold portion of the navigation from a starting location for the navigation to the first location is complete, and that is not satisfied when less than the threshold portion of the navigation from the starting location to the first location is complete.

10. The method of claim 1, wherein the one or more first criteria include a criterion that is satisfied when an estimated time of arrival at the first location is within a threshold duration of a current time, and that is not satisfied when the estimated time of arrival at the first location is outside the threshold duration of the current time.

11. The method of claim 1, wherein the one or more first criteria include a criterion that is satisfied when more than a threshold portion of an estimated travel time from a starting location for the navigation to the first location has passed after initiating the navigation towards the first location, and that is not satisfied when less than the threshold portion of the estimated travel time from the starting location to the first location has not passed after initiating the navigation towards the first location.

12. The method of claim 1, wherein the one or more first criteria include a criterion that is satisfied when a current navigation position is within a threshold distance from a point of divergence between a plurality of navigation paths to the first location, and that is not satisfied when the current navigation position is outside the threshold distance from the point of divergence.

13. The method of claim 1, wherein the one or more first criteria include a criterion that is satisfied when a current navigation position is within a threshold duration of an estimated time of arrival at a point of divergence between a plurality of navigation paths to the first location, and that is not satisfied when the current navigation position is outside the threshold duration of the estimated time of arrival at the point of divergence.

14. The method of claim 1, wherein the first location is determined in accordance with user history or preferences associated with the first location.

15. The method of claim 1, further comprising:

after receiving the second input and initiating the navigation towards the second location:

in accordance with a determination that one or more fourth criteria are satisfied, prompting for input for determining a third location corresponding to a third navigation destination, the third navigation destination having a third level of specificity, more specific than the second level of specificity;

receiving, via the one or more input devices, a third input in response to the prompt; and in accordance with a determination that the third input satisfies one or more fifth criteria, directing navigation towards the third location corresponding to the third navigation destination.

16. The method of claim 1, wherein the one or more first criteria include at least one of:

a criterion that is satisfied based on a current state of traffic from a current navigation position to the first location;

a criterion that is satisfied based on a current state of weather at the first location;

a criterion that is satisfied based on a current state of activity of others at the first location;

a criterion that is satisfied based on calendar data associated with a user of the computing system; or a criterion that is satisfied based on a number of people participating in the navigation towards the first location.

17. The method of claim 1, wherein prompting for input includes suggesting a respective navigation destination having a third level of specificity, more specific than the first level of specificity.

18. A non-transitory computer readable storage medium storing one or more programs, the one or more programs comprising instructions, which when executed by one or more processors of a computing system in communication with one or more input devices, cause the computing system to:

receive, via the one or more input devices, a first input indicating a first navigation destination at a first level of specificity;

direct navigation towards a first location corresponding to the first navigation destination;

while navigating towards a first location corresponding to the first navigation destination is ongoing and before reaching the first location:

in accordance with a determination that one or more first criteria are satisfied, including a first criterion that is based on a confidence value of the first navigation destination, prompt for input for determining a second location corresponding to a second navigation destination with a first frequency or first timing, the second navigation destination having a second level of specificity, more specific than the first level of specificity; and in accordance with a determination that one or more second criteria are satisfied, including a second criterion that is based on the confidence value, prompt for input for determining the second location corresponding to the second navigation destination with a second frequency different from the first frequency or second timing different from the first timing;

receive, via the one or more input devices, a second input in response to the prompt; and in accordance with a determination that the second input satisfies one or more third criteria, direct navigation towards the second location corresponding to the second navigation destination.

19. The non-transitory computer readable storage medium of claim 18, wherein the first navigation destination at the first level of specificity corresponds to a first plurality of candidate navigation destinations, and the second navigation destination at the second level of specificity corresponds to a second plurality of candidate navigation destinations, wherein the second plurality of candidate navigation destinations is a subset of the first plurality of candidate navigation destinations.

20. The non-transitory computer readable storage medium of claim 18, wherein the second navigation destination is within a region defined by the first navigation destination.

21. The non-transitory computer readable storage medium of claim 18, wherein the second navigation destination is determined using data from the first input and data from the second input.

22. The non-transitory computer readable storage medium of claim 18, wherein the one or more first criteria include a criterion that is satisfied when the first navigation destination corresponds to an area larger than a threshold area, and that is not satisfied when the first navigation destination corresponds to an area smaller than the threshold area.

23. The non-transitory computer readable storage medium of claim 18, wherein the one or more first criteria include a criterion that is satisfied when the first navigation destination corresponds to more than a threshold number of potential navigation destinations, and that is not satisfied when the first navigation destination corresponds to fewer than the threshold number of potential navigation destinations.

24. The non-transitory computer readable storage medium of claim 18, wherein the instructions, when executed by the one or more processors, further cause the computing system to:

while the navigation towards the first navigation destination is ongoing and in accordance with a determination that the one or more first criteria are not satisfied, forgoing prompting for input for determining a respective navigation destination having the second level of specificity.

25. The non-transitory computer readable storage medium of claim 18, wherein the one or more first criteria include a criterion that is satisfied when a current navigation position is within a threshold distance of the first location, and that is not satisfied when the current navigation position is outside the threshold distance of the first location.

26. The non-transitory computer readable storage medium of claim 18, wherein the one or more first criteria include a criterion that is satisfied when more than a threshold portion of the navigation from a starting location for the navigation to the first location is complete, and that is not satisfied when less than the threshold portion of the navigation from the starting location to the first location is complete.

27. The non-transitory computer readable storage medium of claim 18, wherein the one or more first criteria include a criterion that is satisfied when an estimated time of arrival at the first location is within a threshold duration of a current time, and that is not satisfied when the estimated time of arrival at the first location is outside the threshold duration of the current time.

28. The non-transitory computer readable storage medium of claim 18, wherein the one or more first criteria include a criterion that is satisfied when more than a threshold portion of an estimated travel time from a starting location for the navigation to the first location has passed after initiating the navigation towards the first location, and that is not satisfied when less than the threshold portion of the estimated travel time from the starting location to the first location has not passed after initiating the navigation towards the first location.

29. The non-transitory computer readable storage medium of claim 18, wherein the one or more first criteria include a criterion that is satisfied when a current navigation position is within a threshold distance from a point of divergence between a plurality of navigation paths to the first location, and that is not satisfied when the current navigation position is outside the threshold distance from the point of divergence.

30. The non-transitory computer readable storage medium of claim 18, wherein the one or more first criteria include a criterion that is satisfied when a current navigation position is within a threshold duration of an estimated time of arrival at a point of divergence between a plurality of navigation paths to the first location, and that is not satisfied when the current navigation position is outside the threshold duration of the estimated time of arrival at the point of divergence.

31. The non-transitory computer readable storage medium of claim 18, wherein the first location is determined in accordance with user history or preferences associated with the first location.

32. The non-transitory computer readable storage medium of claim 18, wherein, the instructions, when executed by the one or more processors, further cause the computing system to:

after receiving the second input and initiating the navigation towards the second location:

in accordance with a determination that one or more fourth criteria are satisfied, prompting for input for determining a third location corresponding to a third navigation destination, the third navigation destination having a third level of specificity, more specific than the second level of specificity;

receiving, via the one or more input devices, a third input in response to the prompt; and in accordance with a determination that the third input satisfies one or more fifth criteria, directing navigation towards the third location corresponding to the third navigation destination.

33. The non-transitory computer readable storage medium of claim 18, wherein the one or more first criteria include at least one of:

a criterion that is satisfied based on a current state of traffic from a current navigation position to the first location;

a criterion that is satisfied based on a current state of weather at the first location;

a criterion that is satisfied based on a current state of activity of others at the first location;

a criterion that is satisfied based on calendar data associated with a user of the computing system; or a criterion that is satisfied based on a number of people participating in the navigation towards the first location.

34. The non-transitory computer readable storage medium of claim 18, wherein prompting for input includes suggesting a respective navigation destination having a third level of specificity, more specific than the first level of specificity.

35. An electronic device, comprising:

one or more input devices;

one or more processors configured to:

receive, via the one or more input devices, a first input indicating a first navigation destination at a first level of specificity;

direct navigation towards a first location corresponding to the first navigation destination;

while navigating towards a first location corresponding to the first navigation destination is ongoing and before reaching the first location:

in accordance with a determination that one or more first criteria are satisfied, including a first criterion that is based on a confidence value of the first navigation destination, prompt for input for determining a second location corresponding to a second navigation destination with a first frequency or first timing, the second navigation destination having a second level of specificity, more specific than the first level of specificity; and in accordance with a determination that one or more second criteria are satisfied, including a second criterion that is based on the confidence value, prompt for input for determining the second location corresponding to the second navigation destination with a second frequency different from the first frequency or second timing different from the first timing;

receive, via the one or more input devices, a second input in response to the prompt; and in accordance with a determination that the second input satisfies one or more third criteria, direct navigation towards the second location corresponding to the second navigation destination.

36. The electronic device of claim 35, wherein the first navigation destination at the first level of specificity corresponds to a first plurality of candidate navigation destinations, and the second navigation destination at the second level of specificity corresponds to a second plurality of candidate navigation destinations, wherein the second plurality of candidate navigation destinations is a subset of the first plurality of candidate navigation destinations.

37. The electronic device of claim 35, wherein the second navigation destination is within a region defined by the first navigation destination.

38. The electronic device of claim 35, wherein the second navigation destination is determined using data from the first input and data from the second input.

39. The electronic device of claim 35, wherein the one or more first criteria include a criterion that is satisfied when the first navigation destination corresponds to an area larger than a threshold area, and that is not satisfied when the first navigation destination corresponds to an area smaller than the threshold area.

40. The electronic device of claim 35, wherein the one or more first criteria include a criterion that is satisfied when the first navigation destination corresponds to more than a threshold number of potential navigation destinations, and that is not satisfied when the first navigation destination corresponds to fewer than the threshold number of potential navigation destinations.

41. The electronic device of claim 35, wherein the one or more processors are further configured to:

while the navigation towards the first navigation destination is ongoing and in accordance with a determination that the one or more first criteria are not satisfied, forgoing prompting for input for determining a respective navigation destination having the second level of specificity.

42. The electronic device of claim 35, wherein the one or more first criteria include a criterion that is satisfied when a current navigation position is within a threshold distance of the first location, and that is not satisfied when the current navigation position is outside the threshold distance of the first location.

43. The electronic device of claim 35, wherein the one or more first criteria include a criterion that is satisfied when more than a threshold portion of the navigation from a starting location for the navigation to the first location is complete, and that is not satisfied when less than the threshold portion of the navigation from the starting location to the first location is complete.

44. The electronic device of claim 35, wherein the one or more first criteria include a criterion that is satisfied when an estimated time of arrival at the first location is within a threshold duration of a current time, and that is not satisfied when the estimated time of arrival at the first location is outside the threshold duration of the current time.

45. The electronic device of claim 35, wherein the one or more first criteria include a criterion that is satisfied when more than a threshold portion of an estimated travel time from a starting location for the navigation to the first location has passed after initiating the navigation towards the first location, and that is not satisfied when less than the threshold portion of the estimated travel time from the starting location to the first location has not passed after initiating the navigation towards the first location.

46. The electronic device of claim 35, wherein the one or more first criteria include a criterion that is satisfied when a current navigation position is within a threshold distance from a point of divergence between a plurality of navigation paths to the first location, and that is not satisfied when the current navigation position is outside the threshold distance from the point of divergence.

47. The electronic device of claim 35, wherein the one or more first criteria include a criterion that is satisfied when a current navigation position is within a threshold duration of an estimated time of arrival at a point of divergence between a plurality of navigation paths to the first location, and that is not satisfied when the current navigation position is outside the threshold duration of the estimated time of arrival at the point of divergence.

48. The electronic device of claim 35, wherein the first location is determined in accordance with user history or preferences associated with the first location.

49. The electronic device of claim 35, wherein the one or more processors are further configured to:

after receiving the second input and initiating the navigation towards the second location:

in accordance with a determination that one or more fourth criteria are satisfied, prompting for input for determining a third location corresponding to a third navigation destination, the third navigation destination having a third level of specificity, more specific than the second level of specificity;

receiving, via the one or more input devices, a third input in response to the prompt; and in accordance with a determination that the third input satisfies one or more fifth criteria, directing navigation towards the third location corresponding to the third navigation destination.

50. The electronic device of claim 35, wherein the one or more first criteria include at least one of:

a criterion that is satisfied based on a current state of traffic from a current navigation position to the first location;

a criterion that is satisfied based on a current state of weather at the first location;

a criterion that is satisfied based on a current state of activity of others at the first location;

a criterion that is satisfied based on calendar data associated with a user of the electronic device; or a criterion that is satisfied based on a number of people participating in the navigation towards the first location.

51. The electronic device of claim 35, wherein prompting for input includes suggesting a respective navigation destination having a third level of specificity, more specific than the first level of specificity.

* * * * *